United States Patent [19]

Ross

[11] 4,376,954
[45] Mar. 15, 1983

[54] SLOW DOWN PROCESSOR FOR VIDEO DISC MASTERING HAVING COLOR PHASE ERROR DETECTOR/CORRECTOR

[75] Inventor: Michael D. Ross, Somerdale, N.J.

[73] Assignee: RCA Corporation, New York, N.Y.

[21] Appl. No.: 215,188

[22] Filed: Dec. 11, 1980

[51] Int. Cl.³ .............................................. H04N 9/491
[52] U.S. Cl. .................................... 358/312; 358/313; 360/10.1; 360/11.1
[58] Field of Search ................... 358/4, 8, 326, 312, 358/313; 360/10, 11, 10.1, 11.1

[56] References Cited

U.S. PATENT DOCUMENTS

| 3,564,123 | 2/1971 | Pezirtzoglov | 178/5.4 |
| 4,007,486 | 2/1977 | Inaba et al. | 358/13 |
| 4,044,379 | 8/1977 | Halter | 358/128 |
| 4,133,009 | 1/1979 | Kittler et al. | 360/9 |
| 4,277,796 | 7/1981 | Ross | 358/8 |

Primary Examiner—Aristotelis M. Psitos
Attorney, Agent, or Firm—E. M. Whitacre; J. S. Tripoli; R. G. Coalter

[57] ABSTRACT

Selected fields of a redundant field slow motion video tape reproduced video signal are stored in a memory at a given clock rate and recovered from the memory at a clock rate inversely proportional to the number of times each field is repeated so as to produce a non-redundant video output signal of reduced bandwidth yet processing the full informational content of the original video signal. The original signal normally exhibits an ordered color field sequence but is subject to anomalous variations from time to time which causes anomalous variation of the chrominance-burst phase relationship of the video output signal. A detector, responsive to a change of a parameter of the ordered sequence of the video input signal, supplies an enabling signal to an inverter circuit which inverts the phase of the burst component of the video output signal whereby the chrominance-burst phase relationship of each field of the video output signal remains unaltered in the presence of said anomalous variations of the ordered sequence of the video input signal.

6 Claims, 26 Drawing Figures

SLOW DOWN PROCESSOR FOR VIDEO DISC MASTERING HAVING COLOR PHASE ERROR DETECTOR/CORRECTOR

This invention relates to video signal processors and particularly to video signal slow down processors of the kind for producing video signals at less than "real time" rates which may advantageously be used in electromechanical video disc mastering applications.

In electromechanical mastering of video disc records the very high information density involved would require the use of a cutterhead of exceptionally wide bandwidth if the mastering were to be done in real time. Cutterhead requirements become less stringent if the recording is done at less than real time rates by reducing the mastering turntable speed and proportionally reducing the recording signal bandwidth. A slow down processor which effects a reduction of bandwidth without loss of the informational content of the slowed down signal is disclosed in the copending U.S. patent application of M. D. Ross entitled "SLOW DOWN PROCESSOR FOR VIDEO DISC MASTERING", Ser. No. 087,452 filed Oct. 22, 1979, which issued July 7, 1981, as U.S. Pat. No. 4,277,796 and is incorporated herein by reference.

In the Ross apparatus, a tape recorder produces a redundant field video signal, each field being produced at a rate corresponding to the rate at which it was originally recorded. A selected field of each set of redundant fields is written into a memory at a given clock rate and the stored fields are read from the memory at a lesser clock rate, the ratio of the clock rates being predetermined in accordance with the redundancy level of the redundant field video signal.

It is desirable in practicing the Ross invention to store only those portions of the selected fields which are representative of picture information and to regenerate repetitive video signal components (e.g., color burst and horizontal sync) at the output of the storage unit thereby substantially reducing the storage requirements. Video storage units having such a feature are commercially available. One example is the type TFS-121 frame synchronizer made by RCA Corporation.

It has been found in practicing the Ross invention that the normally ordered field sequence of the video signal produced by the tape recorder may be subject to anomalous variations from time to time. This problem can lead to a condition wherein the phase relationship of the stored chrominance and regenerated burst components of the video signal produced by the frame store may become reversed. This condition, referred to hereinafter as a "phase flip", can have the effect of reversing the hue of the slowed down video signal produced by the frame store during fields when the aforementioned anomalies occur.

It has been found, for purposes of video disc mastering, that the problem of random fields having reverse color (i.e., a phase flip) is very objectionable and this problem is greatly accentuated when the finished record is played back in a still frame or slow motion mode. The present invention is directed to meeting the need for a slow down processor suitable for video disc mastering in which the incidence of phase flips of the slowed down video output signal is substantially reduced.

A slow down processor, in accordance with the invention, comprises tape recorder means operable in a slow motion playback mode for producing a redundant field composite video signal comprising sequential sets of fields, each field being produced at a standard field rate, each set of fields normally comprising a predetermined number of similar fields but being subject to anomalous variations of the number of fields per set. A frame storage means, responsive to the redundant field video signal and to a control signal produced by the tape recorder means, stores a selected field of each set of fields and reproduces the stored selected fields at a field rate less than the standard field rate to provide a non-redundant field video output signal of reduced bandwidth. The frame storage means is of a type in which the color burst component of the composite video signal supplied thereto is not stored but is regenerated by color subcarrier regenerator means and added by adder means to the reproduced video output signal. Detector means, responsive to a signal manifestation produced by the tape recorder means, detects selected ones of the anomalous variations of the number of fields per set and produces a control signal. The control signal is applied to an inverter means for inverting the phase of the regenerated color burst component of the non-redundant video output signal when the control signal is present.

IN THE DRAWINGS

Figure 1:
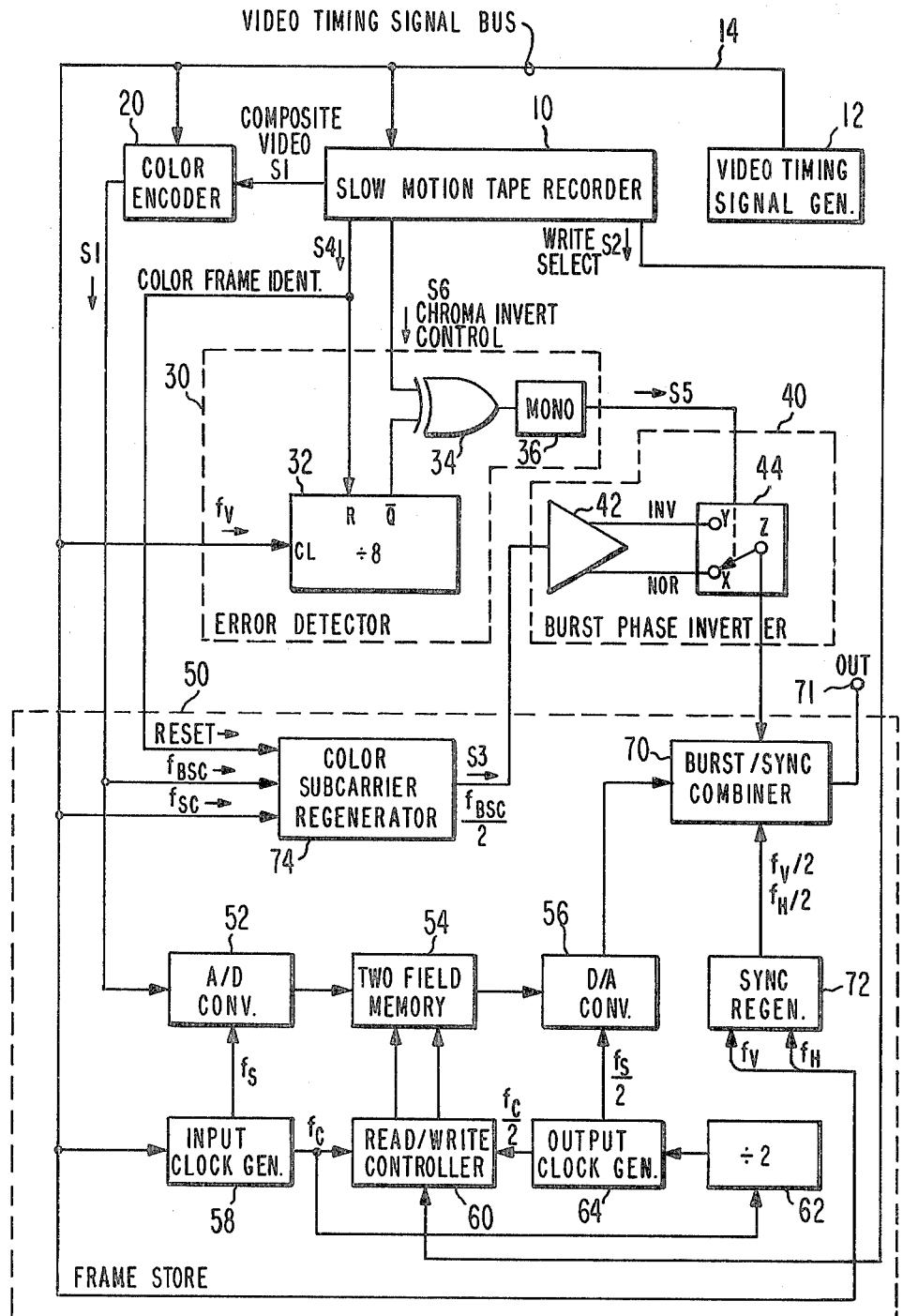
FIG. 1 is a block diagram of a slow down processor embodying the invention.

The slow down processor of FIG. 1 comprises a slow motion tape recorder 10, a color encoder 20, an error detector 30, a burst phase inverter 40 and a video frame storage unit 50. Video timing and color reference signals for synchronizing operation of the recorder, encoder, detector and frame store are provided by a video timing signal generator 12 via a timing signal bus 14. A generator suitable for producing NTSC format standard video timing signals is the Tektronix Model 146 NTSC Test Signal Generator. (For processing signals in other formats, such as PAL, an appropriate generator should be used).

Recorder 10 is preferably of the non-segmented helical scan type such as the Ampex Corporation Model VPR-1 or VPR-2 Video Production Recorders. In such machines the video pickup head is servo controlled for movement in two planes within the video scanning drum. This feature, known as automatic scan tracking (AST), enables the video head to repeatedly scan a given field recorded on the tape before advancing to the next field. In the slow motion operating mode the tape speed of the recorder is reduced in proportion to the number of times each field is scanned and the video head velocity is maintained at its normal value so that redundant (i.e., repeated) fields are produced at the normal field rate (about 60 fields per second in the NTSC system).

The redundant field normal rate (60 fields/second) composite video signal S1 produced by recorder 10 is translated to buried subcarrier format (BSC) prior to selective storage in frame store 50 by means of color encoder 20. In the buried subcarrier format (described by Pritchard in U.S. Pat. No. 3,872,498) chrominance information is represented by a color subcarrier of the general form employed in the well known NTSC format but is buried in a lower portion of the video band rather than being located in the high end of the luminance signal band. An illustrative subcarrier frequency choice for encoding of NTSC format signals is in the vicinity of 1.53 MHz with color sidebands extending ±500 KHz thereabout and with the luminance signal band extending well above the highest color subcarrier frequency (to 3 MHz, for example). The Pritchard patent discloses suitable arrangements for implementing the color encoding function of encoder 20. While buried subcarrier encoding is preferred when the processor of FIG. 1 is used as a video disc mastering signal source, it is not essential to the present invention. The principles of the present invention apply to high band and low band color formats as well as to the BSC format. Also, other color subcarrier choices such as 1.52 MHz or 2.29 MHz may be more appropriate when processing PAL format signals in buried subcarrier form.

Frame store 50 is similar in many respects to conventional storage units used for frame synchronization in television studio applications (see, for example U.S. Pat. Nos. 4,101,926 and 4,110,785 which issued July 18, 1978 and Aug. 10, 1978, respectively) and may be implemented by modifying a conventional frame synchronizer as described in the aforementioned Ross patent application. As previously mentioned, a commercially available synchronizer suitable for this purpose is the model TFS-121.

Frame store 50 comprises an analog-to-digital (A/D) converter 52 for converting the composite video signal S1 to digital form for application to a two field memory 54 and a digital-to-analog (D/A) converter 56 for reconverting the signal back to analog form. In the type TFS-121 synchronizer the A/D converter output is bit serial and a serial-in-parallel-out (SIPO) buffer is used to convert the signal to a word organized form (8 bit) for storage in memory 54. A parallel-in serial-out (PISO) buffer is then used for reconverting the memory output to serial form for application to a D/A converter 56. A/D converter 52 receives a sampling signal $f_s$ from an output of input clock generator 58 which is synchronized with timing signals supplied by generator 12. A preferred value of $f_s$ is 4 fsc, wherein fsc is the NTSC color burst frequency. Clock generator 58 also supplies a write clock signal $f_c$ to read/write controller 60 and to the input of divider circuit 62 which divides $f_c$ by two. This represents the "slow down" factor of the processing system and equals the number of identical fields in each set of redundant fields produced by the slow motion tape recorder. For other slow down rates the division factor of divider 62 should be appropriately selected (e.g., 3 for a one third rate mastering system). The resultant timing signal (reduced by the factor 2) is applied to the input of an output clock generator 64 which, in turn, supplies a reduced rate sampling signal ($f_s/2$) to D/A converter 56 and a reduced rate read clock signal ($f_c/2$) to read/write controller 60.

The aforementioned Ross application gives specific examples of how to select fields such that those which are stored form a proper NTSC color field sequence (i.e., odd, 0°; even, 0°; odd 180°; even 180°) when recovered from the memory 54 of the frame store. In FIG. 1 herein, the selection is controlled by the write select signal S2 applied to read/write controller 60. S2 is derived from the sync correction or field change control signal that is normally used for correcting vertical sync in the slow motion tape recorder when the slow down factor, N, is equal to 2. Generation of S2 for other slow down factors is described in the Ross application.

Video timing signals (e.g., sync, and burst) are not stored in the memory since they are predictable repetitive functions. Rather, they are added to the output of D/A converter 56 by means of burst-sync combiner 70 to thereby provide a composite video output signal at output terminal 71. It is conventional practice in storing digitized video signals to reinsert timing signals which are rephased replicas of the original timing signals. Here, however, the reinserted timing signals are related to the redundancy level, N, of the input video signal. (As used herein, redundancy level means the number of replications of a given field produced by the slow motion recorder before the video head is advanced to the next field). Specifically; burst and sync are added to the output of D/A converter 56 at 1/Nth of their original respective periods. For half rate (N=2) mastering of BSC encoded video, the burst is reinserted at a frequency of 765 KHz (1.53 MHz/2), vertical synchronizing pulses are added at a repetition rate of about 30/sec (one half the NTSC standard field rate) and horizontal synchronizing pulses are added at 127 microsecond intervals (twice the normal line period).

The vertical and horizontal synchronizing signals are derived from the NTSC timing signal produced by generator 12 by means of sync regenerator 72. Burst-sync combiner 70 includes a gate responsive to the regenerated horizontal synchronizing signal ($f_H/2$) produced by sync regenerator 72 for gating the color subcarrier reference signal S3 produced by color subcarrier regenerator 74 prior to addition thereof to the recovered luminance and chrominance signals and the regenerated sync signals. The gate is enabled during the so called "back porch" interval of the horizontal sync pulse and for a period of time twice as long as in the NTSC standard. Since the gate time is increased by the same factor 2, as the regenerated subcarrier is reduced in frequency, the resultant output burst signal includes the same number of cycles (3–4) as in a normal (real time) rate BSC composite video signals.

Color subcarrier regenerator 74 may be implemented by dividing the output of the regenerator in the model TFS-121 frame synchronizer by the slow down factor (2 in this case) and periodically resetting the divider by means of the color frame identification signal S4 produced by recorder 10 to maintain a consistent phase relationship between the divider output signal and the chrominance signal recovered frame memory 54. A preferred color subcarrier regenerator is described in the U.S. patent application of M. D. Ross and J. K. Clemens entitled "COLOR SUBCARRIER REGENERATOR FOR SLOW DOWN PROCESSOR" Ser. No. 190,277 filed Sept. 24, 1980. The Ross-Clemens regenerator additionally includes heterodyning circuitry responsive to the reference subcarrier component ($f_{sc}$) of the video timing signal produced by signal generator 12 and to the burst component $f_{BSC}$ of the encoder output signal S1 for automatically compensating for phase changes in the regenerated subcarrier S3 which may occur due to cable length differences when switching between different tape recorders and/or color encoders.

The regenerated color subcarrier S3 produced by regenerator 74 is applied to burst-sync combiner 70 via a path through burst phase inverter 40. The path includes a differential output amplifier 42 which produces normal and inverted replicas of S3 and a single pole double throw switch 44. The switch input terminals X and Y are connected to the normal and inverting output terminals of amplifier 42 and the switch output terminal Z is coupled to the subcarrier input terminal of burst-sync combiner 70 in frame store 50. When the switch is in its normal or unactivated position, as illustrated, terminal X is coupled to terminal Z and the subcarrier signal S3 produced by regenerator 74 is coupled to burst-sync combiner 70 without inversion. Conversely, when the switch is activated by a control signal S5 supplied thereto, terminal Y is coupled to terminal Z and the regenerated subcarrier signal S3 is inverted and applied to combiner 70.

Generation of the signal S5 which controls inverter 40 is provided by error detector 30 comprising a divide-by-eight divider 32, an exclusive-OR gate 34 and a monostable multivibrator 36. The divider is clocked by the vertical synchronizing component, fv, of the timing signal produced by generator 12 and periodically reset by the color frame identification signal S4 produced by recorder 10. Exclusive-OR gate 34 has one input connected to the complemented output ($\overline{Q}$) of counter 32 and its other input connected to receive a chrominance invert control signal S6 generated by recorder 10. The output of gate 34 is coupled to the trigger input of a negative edge triggered monostable multivibrator 36 having a guasi-stable state period of N times the period of fv (i.e., 1/30th of a second for half rate recording of NTSC program material or 1/25th of a second for half rate recording of PAL 625/50 format program material). The output of multivibrator 36 is coupled to the control input of switch 44 to supply the control signal S5 thereto.

The function of divider 32 is to produce a binary output signal having the same period as the chrominance invert control signal S6 produced by recorder 10 which, as will be explained, is normally high for four fields and low for four fields when recorder 10 is run at half speed. Divider 32 is reset by the color frame identification signal S4 every eight fields to assure that, in the absence of field sequence anomalies, the output signal at the complemented output of divider 32 will be in phase with the signal S4. As long as the signals so produced are identical, exclusive OR gate 34 will be disabled, multivibrator 36 will not be triggered and inverter 40 will be disabled so that S3 will not be inverted prior to application to combiner 70. As explained in more detail subsequently, should recorder 10 produce an anomalous field sequence the signal S6 will differ from the reference signal produced by divider 32 thereby enabling gate 34. Subsequently, when gate 34 is disabled, multivibrator 36 will be triggered and will generate the signal S5 for a period of time equal to one "slowed down" field. In response to the signal S5, inverter 40 will be activated and will invert the phase of the regenerated color subcarrier signal S3 applied to combiner 70.

Figure 2:
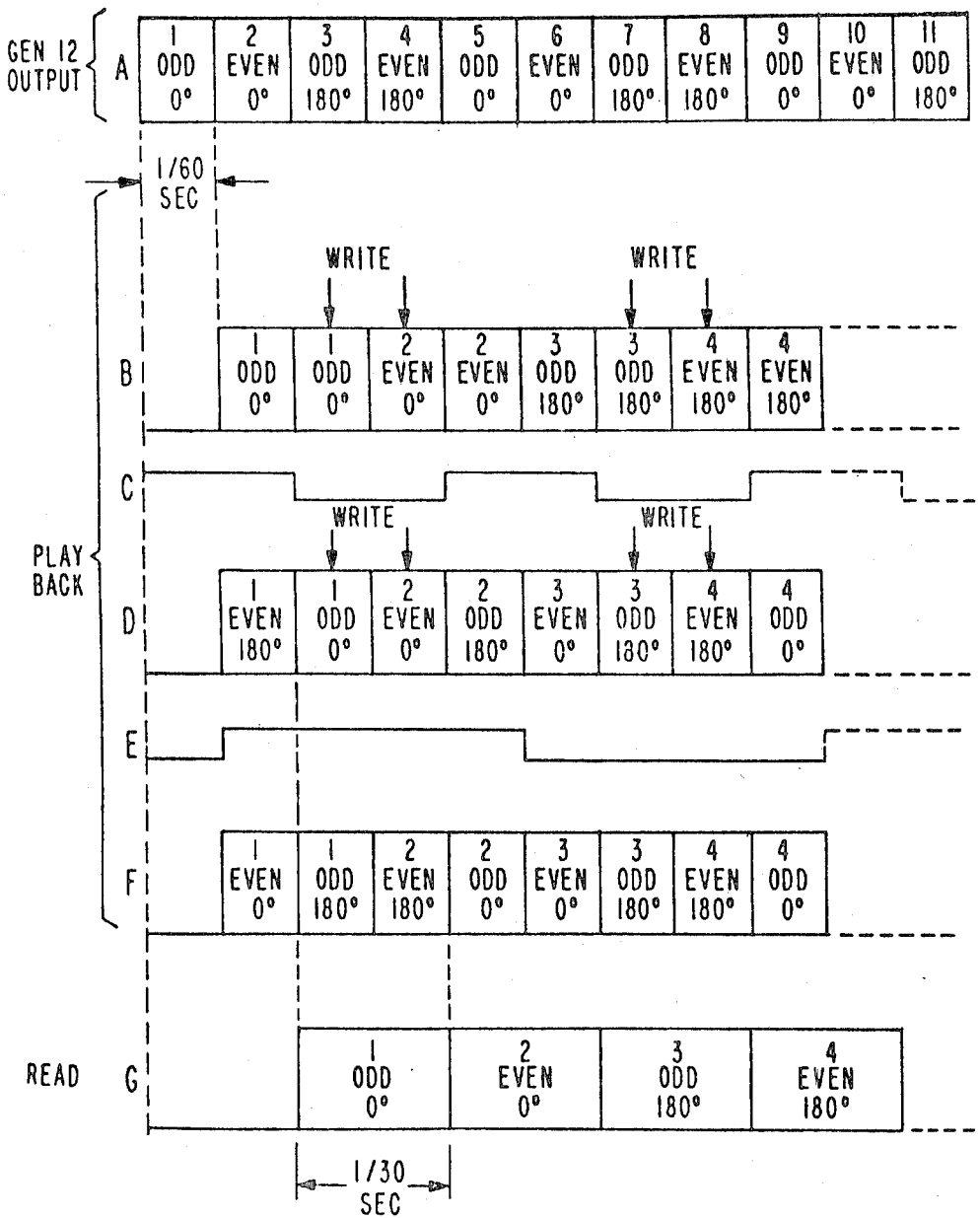
FIGS. 2, 3 and 4 are waveform diagrams illustrating certain aspects of the operation of the processor of FIG. 1.

Overall operation of the processor of FIG. 1 is most easily understood by first considering a case where recorder 10 produces a correct output field sequence i.e., one in which the number of similar fields in each set of redundant fields is constant and not subject to anomalous variation. FIG. 2 illustrates such a case. Subsequently, examples will be given of how anomalous variation of the field sequence of the signal S1 can have the effect of reversing the phase relationship of the stored chrominance signal relative to the regenerated burst signal, how detector 30 detects the anomalies and how inverter 40 corrects the chrominance-burst phase relationship of the output signal of output terminal 71 to eliminate the "phase flip" which otherwise would occur.

Waveform A of FIG. 2 shows the field sequence of the video timing signals produced by generator 12. This sequence is invariant for all "down speed" mastering rates and will be recognized as being a standard NTSC sequence in which vertical sync alternates (odd-even-odd, etc.) from field-to-field and chrominance phase reverses with each odd field (1,3,5 . . . ). A complete color frame thus comprises a set of four fields having all possible combinations of sync and phase (e.g., odd 0°, even 0°, odd 180°, even 180°). For convenience of discussion, the fields are arbitrarily numbered 1–11 for the NTSC field sequence shown. The invention, however, may readily be applied to other broadcasting standards such as PAL (8 fields per color frame) or SECAM (12 fields per color frame).

Waveform B of FIG. 2 shows the field sequence of the video head output of recorder 10 (an Ampex VPR-1 or VPR-2 as previously mentioned) upon playback of an NTSC recorded tape at half speed. The field rate (60/sec) is the same as that of generator 12 or waveform A and each field recorded on the tape is scanned twice upon playback so that there are two fields one, two fields two, etc. Synchronizing circuits within recorder 10 and responsive to the output of generator 12 aligns the first field on playback (odd, 0°) with field two of the generator output (even, 0°). Since each field is scanned twice the sync-phase sequence (at the playback head output) is Odd 0°, Odd 0°, Even 0°, Even 0°, Odd 180° etc. as shown. This, of course, is not an NTSC field sequence and would not produce an acceptable picture if monitored at the playback head output. The Ampex VPR-1 recorder, however, includes sync and chroma correction circuitry for converting the non-NTSC signal of waveform B to a correct NTSC sequence as shown in waveform F.

At this point it is instructive to note that in waveform F (corrected NTSC) each field set (1-1, 2-2, 3-3, etc.) does not include at least one field which is a member of a subset conforming to the NTSC broadcasting standard. One cannot, for example, pick one field from each of the four redundant sets of fields such that the four selected fields have a sequence Odd 0°, Even 0°, Odd 180°, Even 180° (standard NTSC). The significance of this is that while the normal output of recorder 10 has a correct NTSC field sequence, it is not a proper sequence for purposes of storage in memory 54.

To arrive at a correct field sequence for storage in memory 54 it is helpful to consider how waveform F (the normal output of recorder 10) is derived from waveform B (the uncorrected video head output). This is done by means of sync and chroma correction circuits in the recorder. As shown in waveform C, circuitry within the recorder produces a sync correction signal which activates other circuitry in the associated time base correction unit of the recorder that changes even fields to odd (and vice versa) during fields 1, 2, 5, 6 and 9 of waveform A. This is signified by a high level for waveform C. As a result, the first field 1 of waveform B is changed from Odd to Even, the second field 2 is changed from Even to Odd, etc., as shown in waveform D. Thus, in terms of vertical sync, waveform D is an NTSC sequence but not so in terms of its chroma phase (note also that a change in vertical sync necessarily also reverses chroma phase). This is provided for in the associated time base correction unit of the recorder by a chroma phase inverter circuit which as shown in waveform E inverts the chroma phase (as signified by a high level) of waveform D during frames 2-5 of waveform A to thereby produce the NTSC sequence of waveform F.

With the above background in mind, it is apparent that although one cannot select one field of each redundant field set from waveform F such that a correct NTSC four field sequence can be formed, one may select such fields from waveforms B or D with the aid of waveform C. Note that when waveform C is low (meaning no sync correction is being done in the recorder) that waveforms B and D both contain a single field (identified by arrows) in each of the four sets of redundant fields 1-1, 2-2, 3-3, 4-4 which if placed in sequence would conform to the NTSC standard. Thus, the sync correction signal which is normally used for correcting vertical sync in the recorder may be used as the write select signal S2 shown in FIG. 1 which identifies which fields produced by recorder 10 are to be stored in memory 54. For the example given they correspond in time to fields 3, 4, 7 and 8 of waveform A.

As mentioned, either of waveforms B or D could be supplied (via BSC encoder 20) to frame storage unit 50 for storage in memory 54. One need not, however, add a cable to either the reproduce head processing circuitry or the sync correction circuitry in the recorder to obtain the desired signals. One need only inhibit the video output portion of the chroma correction circuitry mentioned previously and waveform D will appear at the output of the machine rather than waveform F. This has the advantage of avoiding separation of the chrominance and luminance signal components as is done in conventional chroma inverter circuits and providing a time base stabilized signal to the BSC encoder 20.

As shown in waveform G one may begin readout of field 1 immediately as it is being stored. This is possible because the write clock rate is greater than the read clock rate. An alternative would be to begin reading field 1 at the end of writing field 2. In either case the resultant output signal is a contiguous series of video fields containing all the informational content of the original signal (no missing or skipped fields), having an NTSC sync and phase sequence, a buried subcarrier chrominance format and having half the bandwidth of the original video signal.

The chroma invert control signal, (waveform E) when no field sequence anomalies occur, is high for four fields (2-5) and low for four fields (6-9). This corresponds to S6 in FIG. 1 and is identical to the signal produced by divider 32. Accordingly, as long as this relationship is maintained, gate 34 is disabled so that the regenerated subcarrier signal S3 is applied without inversion to burst-sync combiner 70. This represents the normal operation of the processor of FIG. 1 and as long as the field sequence produced by recorder 10 is of the proper order (1-1, 2-2, 3-3, 4-4, etc.) the phase of the regenerated color subcarrier signal S3 relative to the chrominance component of the video signals stored in memory 54 will conform to the chroma-burst phasing of the signal S1.

Figure 3:
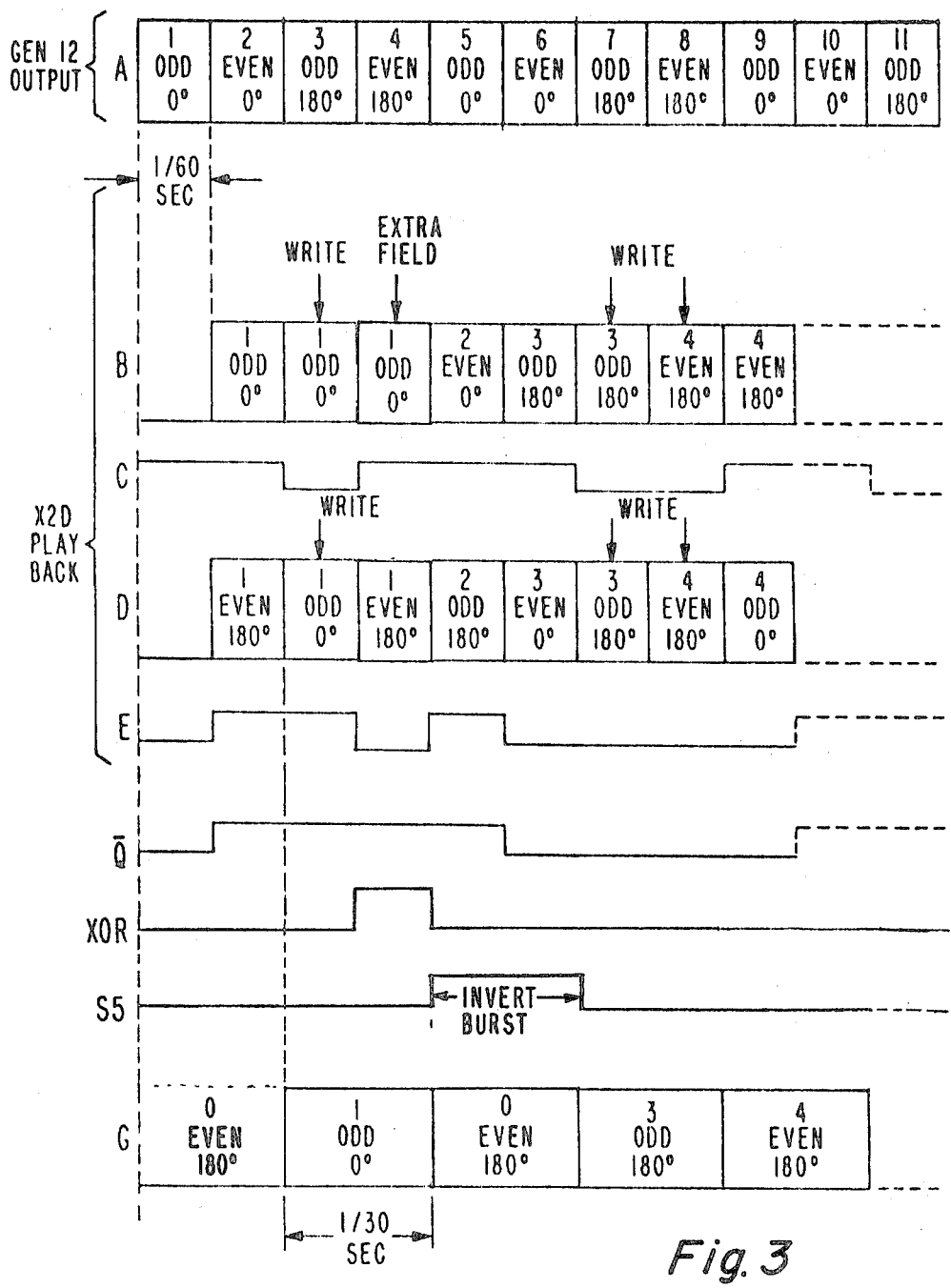

FIG. 3 illustrates a case wherein the normally ordered field sequence produced by recorder 10 is subject to an anomaly. Specifically, instead of waveform B containing two fields per set (as in FIG. 2) there is an extra field 1 (odd, 0°) in the first set of fields and only a single field 2 (even, 0°) in the second set. The cause of such an anomaly is not fully understood but its effect in recorder 10 is to alter the symmetry of waveforms C and E. Specifically, relative to the waveform of FIG. 2, waveform C changes from low to high and waveform E changes from high to low during the period of time that the extra field is being produced. Since waveform C, normally used for field reversal in recorder 10, is used in the system of FIG. 1 to identify which fields are to be stored in memory 54 when low, the result is that the extra field will not be stored in memory 54.

Ignoring for a moment the action of detector 30 and inverter 40, the effect of not storing the extra field in memory 54 is to cause the frame store to re-read a previously stored field. Memory 54, it will be recalled, is a two field memory in which fields are alternately stored in separate memory locations. Accordingly, after reading newly stored field 1 (odd, 0°) read/write controller 60 addresses memory 54 which will then re-read the field stored during the previous write sequence. Since Odd-0° fields are preceded by Even-180° fields in the NTSC system memory 54 will reproduce field "0" (even-180°) both before and after field 1, as shown in waveform G.

From waveform G it is seen that for this specific anomaly (an extra field 1-Odd-0°) the field sequence produced by the frame store 50 is correct in terms of vertical sync (Odd-Even-Odd-Even) and so the video output signal will be properly interlaced notwithstanding the presence of the anomaly. However, the phase of the stored chrominance signal (0°-180°-180°-180°) does not conform to the NTSC standard and since burst is reinserted in the proper sequence (0°-0-180°-180°) there will be one field where the chrominance signal phase is opposite to that of the regenerated burst phase. This represents the "phase flip" condition previously referred to and when monitored the effect is that the hue of the picture will be reversed (reds appear cyan, blues appear yellow-green, etc.).

In accordance with one aspect of the invention, the phase flip is detected by comparing the normally symmetrical waveform E (signal S6 produced by recorder 10) with the reference waveform $\overline{Q}$ produced by divider 32. The comparison is performed by exclusive-OR gate 34 which, as shown by waveform XOR, produces a high level output signal whenever waveforms E and $\overline{Q}$ differ. Multivibrator 36 is triggered by the falling edge of waveform XOR thereby generating the signal S5 for a period of time corresponding to one slowed down field (1/30th second). Inverter 40 is then activated by S5 thereby inverting the phase of the regenerated color subcarrier S3 during the interval that the field with reverse color (0-Even-180°) is being read from memory 54. The net effect is that even though the chrominance signal phase sequence does not conform to the NTSC standard, the phase of the regenerated burst, being reversed, will conform to that of the recovered chrominance signal and so the color of the resultant picture, when monitored, will appear correct instead of reversed.

Figure 4:
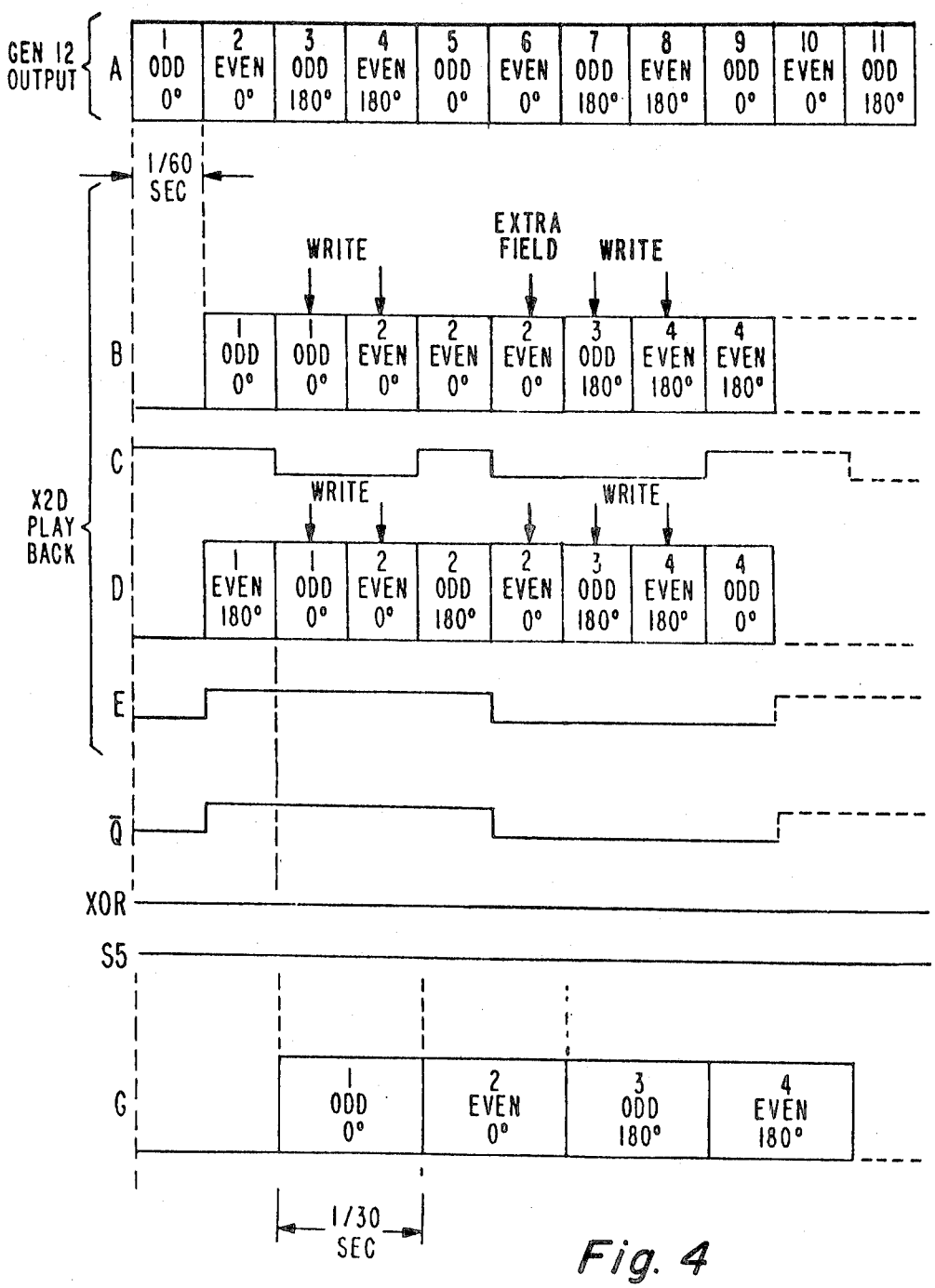

In the example of FIG. 3, one case was considered where an anomalous extra field caused a "no-write" operation in frame store 50 and re-reading of a previously stored field. A phase flip of the chrominance output signal resulted because the stored chrominance signal was of opposite phase to the regenerated color subcarrier and was corrected by reversing the subcarrier phase. FIG. 4 illustrates a quite different case where an anomalous extra field results in an extra write operation in frame store 50 and no phase flip. In this case the anomalous change in the number of fields per set is not detected and the subcarrier phase is not inverted. The significance of this, as will now be explained, is that detector 30 recognizes only selected anomalous fields, namely those which would tend to cause an alteration in the chroma-burst phase relationship of the output signal produced by frame store 50 and essentially ignores anomalies which do not result in phase flips.

More specifically, in FIG. 4 the field sequence of waveform B includes an extra field 2 (even, 0°) in the second set of fields. Since the extra field of waveform B is identical in terms of vertical sync and chroma phase to waveform D (FIG. 2) which it replaces (3-Even-0°), the recorder time base corrector field reversal control signal (waveform C) will be low during the period of time the extra field is present. Waveform C, however, corresponds to signal S2 of FIG. 1 and will cause the extra field to be written into memory 54. Simultaneously, memory 54 is reading the originally stored field 2 and since the extra field 2 is identical in terms of sync and chroma phase (both Even-0°) there can be no error in the phase relationship of the stored chrominance signal and regenerated burst. Detector 30 does not generate the subcarrier inversion control signal S5 because there is not change in the chroma phase sequence of waveform D and thus no change in the symmetry of the chroma invert control signal waveform E. Thus waveforms E and $\bar{Q}$ remain identical, exclusive OR gate 34 is not activated and multivibrator 36 is not triggered.

From the discussion of FIGS. 3 and 4 it has been demonstrated that detector 30 correctly identifies the fields requiring chroma-burst phase correction by effectively sensing variations in the symmetry of waveform E produced by recorder 10 relative to its normal waveshape. For this purpose one could employ symmetry detection means other than the specific combination of a divider and exclusive-OR gate illustrated provided the means chosen is capable of producing an output signal of the illustrated form for the various conditions shown. There are other alternatives for implementing the function of multivibrator 36. It may, for example, comprise a bistable rather than a monostable multivibrator. If a bistable is used it could be reset by dividing the vertical sync signal fv by two to assure that a two field pulse period is produced (the signal fv/2 is produced also at the output of sync regenerator 72). There are several alternatives for implementing inverter 40. One example would be to apply the signals S3 and S5 to a four quadrant multiplier such as a type 1491 integrated circuit. Another alternative would be to apply the signal S3 directly to terminal X of switch 44 and couple an inverting amplifier between terminals X and Y.

What is claimed is:

1. A slow down processor, comprising, in combination:
    tape recorder means operable in a slow motion playback mode for producing a redundant field composite video signal comprising sequential sets of fields, each field being produced at a standard field rate, each set of fields normally comprising a predetermined number of similar fields but being subject to anomalous variations of the number of fields per set;
    frame storage means, responsive to said redundant field video signal and to a control signal produced by said tape recorder means, for storing a selected field of each set of fields and for reproducing the stored selected fields at a field rate less than said standard field rate to provide a non-redundant field video output signal of reduced bandwidth, said frame storage means being of a type in which the color burst component of composite video signal supplied thereto is not stored but is regenerated by color subcarrier regenerator means and added by adder means to the reproduced video output signal;
    detector means responsive to a signal manifestation produced by said tape recorder means for detecting selected ones of said anomalous variations of the number of fields per set and producing a control signal; and
    inverter means responsive to said control signal for inverting the phase of the regenerated color burst component of said non-redundant video output signal when said control signal is present.

2. A slow down processor as recited in claim 1 wherein said signal manifestation comprises a normally symmetrical digital signal and wherein said detector means comprises:
    first circuit means responsive to said digital signal for detecting changes in the symmetry thereof and producing an activation signal; and
    second circuit means responsive to said activation signal for producing said control signal for a predetermined period of time, said predetermined period of time being substantially equal to N times the length of one field of said redundant field composite video signal and wherein N equals said predetermined number.

3. A slow down processor as recited in claim 2 wherein said first circuit means comprises:
    means for producing a symmetrical reference signal having a fixed period; and
    means for comparing said reference signal with said digital signal for producing said activation signal in response to a first signal level relationship of the compared signals and terminating said activation signal in response to a second signal level relationship of the compared signals.

4. A slow down processor, comprising, in combination: tape recorder means operable in a slow motion playback mode for producing a redundant field composite video signal comprising sequential sets of fields, each field being produced at a standard field rate, each set of fields normally comprising a predetermined number of similar fields but being subject to anomalous variation of the number of fields per set;
    frame storage means, responsive to said redundant field video signal and to a control signal produced by said tape recorder means, for storing a selected field of each set of fields and for reproducing the stored selected fields at a field rate less than said standard field rate to provide a non-redundant field video output signal of reduced bandwidth, said frame storage means being of a type in which the color burst component of the composite video signal supplied thereto is not stored but is regenerated by color subcarrier regenerator means and added by adder means to the reproduced video output signal;
    detector means responsive to a normally symmetrical chroma invert control signal produced by said tape recorder means for detecting changes in the symmetry thereof and producing a second control signal; and
    inverter means responsive to said second control signal for inverting the phase of the regenerated color burst component of said non-redundant video output signal when said second control signal is present.

5. A slow down processor as recited in claim 4 wherein said detector means comprises:
   means for producing a symmetrical reference signal having a fixed period;
   means for comparing said reference signal with said chroma invert control signal for producing an activation signal in response to a first signal level relationship between the compared signals and for terminating said activation signal in response to a second signal level relationship of the compared signals; and
   bistable means responsive to said activation signal for producing said second control signal.

6. A slow down processor, comprising, in combination: tape recorder means operable in a slow motion playback mode for producing a redundant field composite video signal comprising sequential sets of fields, each field being produced at a standard field rate, each set of fields normally comprising a predetermined number of similar fields but being subject to anomalous variations of the number of fields per set;
   frame storage means, responsive to said redundant field video signal and to a control signal produced by said tape recorder means, for storing a selected field of each set of fields and for reproducing the stored selected fields at a field rate less than said standard field rate to provide a non-redundant field video output signal of reduced bandwidth, said frame storage means being of a type in which the color burst component of the composite video signal supplied thereto is not stored but is regenerated by color subcarrier regenerator means and added by adder means to the reproduced video output signal;
   divider means responsive to a reference signal supplied thereto for producing a symmetrical output signal;
   comparison means for comparing said symmetrical signal produced by said divider means with a normally symmetrical chrominance inverter control signal produced by said tape recorder means for detecting variations in the symmetry of said control signal and producing a trigger signal;
   bistable means responsive to said trigger signal for producing a second control signal having a period substantially equal to one field of said reproduced video output signal; and
   inverter means responsive to said second control signal for inverting the phase of the regenerated color burst component of said non-redundant video output signal when said second control signal is present.

* * * * *